US012570572B2

(12) United States Patent
Yokota

(10) Patent No.: US 12,570,572 B2
(45) Date of Patent: Mar. 10, 2026

(54) GLASS COMPOSITION FOR GLASS FIBER

(71) Applicant: NIPPON ELECTRIC GLASS CO., LTD., Otsu (JP)

(72) Inventor: Yuki Yokota, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 1109 days.

(21) Appl. No.: 17/609,102

(22) PCT Filed: Apr. 21, 2020

(86) PCT No.: PCT/JP2020/017229
§ 371 (c)(1),
(2) Date: Nov. 5, 2021

(87) PCT Pub. No.: WO2020/230550
PCT Pub. Date: Nov. 19, 2020

(65) Prior Publication Data
US 2022/0212980 A1      Jul. 7, 2022

(30) Foreign Application Priority Data

May 10, 2019     (JP) ................................. 2019-089682

(51) Int. Cl.
*C03C 13/00*      (2006.01)
*C03C 3/091*      (2006.01)
(52) U.S. Cl.
CPC .............. *C03C 13/00* (2013.01); *C03C 3/091* (2013.01)
(58) Field of Classification Search
None
See application file for complete search history.

(56) References Cited

U.S. PATENT DOCUMENTS

| | | | |
|---|---|---|---|
| 6,686,304 B1 | 2/2004 | Wallenberger | |
| 2003/0207748 A1* | 11/2003 | Wallenberger | .......... C03C 3/087 |
| | | | 501/66 |
| 2003/0224922 A1* | 12/2003 | Wallenberger | .......... C03C 13/00 |
| | | | 501/36 |
| 2005/0101470 A1 | 5/2005 | Wallenberger | |
| 2005/0101471 A1 | 5/2005 | Wallenberger | |
| 2005/0113238 A1 | 5/2005 | Wallenberger | |
| 2009/0312171 A1* | 12/2009 | Tanaka | .................... C04B 14/42 |
| | | | 501/63 |

FOREIGN PATENT DOCUMENTS

| | | | |
|---|---|---|---|
| EP | 2 330 086 A1 | 6/2011 | |
| JP | 2000247683 A | * 9/2000 | ............. C03C 13/00 |
| JP | 2004-508265 A | 3/2004 | |
| JP | 2005-506267 A | 3/2005 | |
| JP | 2007-039320 A | 2/2007 | |
| JP | 2014234319 A | * 12/2014 | ............. C03C 13/00 |

OTHER PUBLICATIONS

Machine Translation of JP-2014234319-A (Year: 2014).*
Machine Translation of JP-2000247683-A (Year: 2000).*
Japanese Office Action issued Oct. 26, 2022 in Japanese Patent Application No. 2019-089682 with English-language translation.
Extended European Search Report issued Jan. 10, 2023 in European Application No. 20806854.4.
Wallenberger F T et al., "New environmentally and energy friendly fiberglass compositions (E-glass, ECR-glass, C-glass and A-glass)—advances since 1998," Glass Technology: European Journal of Glass Science and Technology Part A, vol. 48, No. 6, Dec. 1, 2007, pp. 305-315.
First Chinese Office Action issued Nov. 21, 2022 in Chinese Patent Application No. 202080035042.2 with English-language translation.
Chinese Office Action issued Oct. 12, 2023 in Application No. 202080035042.2.
International Search Report dated Aug. 4, 2020 for PCT/JP2020/017229.
Written Opinion of the International Searching Authority mailed Aug. 4, 2020 for PCT/JP2020/017229.
Chinese Office Action issued Apr. 24, 2023 in Application No. 202080035042.2.
First Chinese Office Action issued Jun. 27, 2025 in Application No. 202311154889.4.

* cited by examiner

*Primary Examiner* — Amber R Orlando
*Assistant Examiner* — Paul Alan Forsyth
(74) *Attorney, Agent, or Firm* — Faegre Drinker Biddle & Reath LLP

(57) ABSTRACT

A glass composition for a glass fiber, contains: in mass %, $SiO_2$: 50% to 65%, $Al_2O_3$: 12.3% to 13.7%, $B_2O_3$: 1.1% to 5.5%, MgO: 0% to 10%, CaO: 15% to 30%, ZnO: 0% to less than 1%, $Li_2O$: 0% to less than 1%, $Na_2O$: 0% to 2%, $K_2O$: 0% to 2%, $TiO_2$: 0% to less than 0.5%, $SiO_2+MgO+CaO$: 79% to 86%, $Li_2O+Na_2O+K_2O$: 0% to 2%, and being substantially free of $P_2O_5$, wherein $(SiO_2+MgO+CaO)/MgO$ is 30 to 80, and $(MgO+CaO)/MgO$ is 8 to 18 in a mass ratio.

19 Claims, No Drawings

GLASS COMPOSITION FOR GLASS FIBER

TECHNICAL FIELD

The present invention relates to a glass composition for a glass fiber used as a reinforcing material for a composite material or the like.

BACKGROUND ART

Glass fibers used as a composite material with a resin are generally manufactured as follows.

First, a raw material mixture (called a batch) that is prepared and mixed to a desired composition is charged into a melting kiln, and glass is heated by burning heavy oil or gas with a burner or by direct energization to allow melting from the surface of the batch to gradually form molten glass.

Subsequently, the molten glass is supplied to a forming apparatus called a bushing (also called a spinning furnace). The bushing is an apparatus having a substantially rectangular appearance with a large number of nozzle portions (or orifice portions), and the temperature is controlled such that the viscosity of the molten glass at a tip of the bushing nozzle is approximately $10^3$ dPa·s (for example, Patent Literature 1). The temperature at which the viscosity of the molten glass is $10^3$ dPa·s is called a spinning temperature $T_X$. The smaller a temperature difference $\Delta T_{XL}$ between the $T_X$ and a liquidus temperature $T_L$, the more likely devitrified substances are to be generated in the molten glass at the tip of the bushing nozzle, and the more likely a thread breakage is to be occurred. Therefore, it is preferable that $\Delta T_{XL}$ is large.

Thereafter, the molten glass is spun to manufacture glass fibers. Specifically, the molten glass supplied to the bushing is continuously drawn from the tip of the bushing nozzle and rapidly cooled to form filaments, and the filaments are bundled at a predetermined number to obtain glass fibers.

The glass fibers manufactured in this manner are called long fibers and are used for fiber reinforced plastics (FRP) which are structural members of printed wiring boards, cars, airplanes and the like.

CITATION LIST

Patent Literature

Patent Literature 1: JP-A-2007-39320

SUMMARY OF INVENTION

Technical Problem

In the case of manufacturing glass fibers, the temperature inside the melting kiln for melting the glass is 1500° C. or higher, and a huge amount of energy is required in the process from glass melting to spinning. However, due to the growing awareness of global environmental problems in recent years, energy saving is required in the glass industry, which uses a lot of energy. In addition, the higher the temperature for melting, the higher the consumption of heavy oil, gas, and electricity, leading to a rise in manufacturing cost. Under these circumstances, efforts to melt glass at a lower temperature are required.

Further, in the case of manufacturing glass fibers, the higher the spinning temperature, the more the bushing is deformed and the more likely the life is to be shortened, resulting in an increase in manufacturing cost. Therefore, efforts to lower the spinning temperature are also required.

However, when the glass is melted at a low temperature, there is a problem that the melting of a poorly soluble component such as $SiO_2$ in the batch is delayed and an inhomogeneous melt is formed.

In order to melt the molten glass with high homogeneity at a low temperature, there is a method of crushing the poorly soluble raw material to make the particle size finer. However, this method has a problem that the manufacturing cost increases because the step of crushing the raw material is added to the glass manufacturing process. In addition, the spinning temperature cannot be lowered by this method.

An object of the present invention is to provide a glass composition for a glass fiber that enables glass melting and sniping at a low temperature without any special treatment such as crushing of raw materials.

Solution to Problem

A glass composition for a glass fiber according to the present invention contains: in mass %, $SiO_2$: 50% to 65%, $Al_2O_3$: 12.3% to 13.7%, $B_2O_3$: 1.1% to 5.5%, MgO: 0% to 10%, CaO: 15% to 30%, ZnO: 0% to less than 1%, $Li_2O$: 0% to less than 1%, $Na_2O$: 0% to 2%, $K_2O$: 0% to 2%, $TiO_2$: 0% to less than 0.5%, $SiO_2+MgO+CaO$: 79% to 86%, $Li_2O+Na_2O+K_2O$: 0% to 2%, and being substantially free of $P_2O_5$, wherein $(SiO_2+MgO+CaO)/MgO$ is 30 to 80, and $(MgO+CaO)/MgO$ is 8 to 18 in a mass ratio. Here, "$SiO_2+MgO+CaO$" refers to a total content of $SiO_2$, MgO, and CaO, "$Li_2O+Na_2O+K_2O$" refers to a total content of $Li_2O$, $Na_2O$, and $K_2O$, "$(SiO_2+MgO+CaO)/MgO$" refers to a value obtained by dividing the total content of $SiO_2$, MgO, and CaO by the content of MgO, and "$(MgO+CaO)/MgO$" refers to a value obtained by dividing the total content of MgO and CaO by the content of MgO.

Since the glass composition for a glass fiber according to the present invention adopting the above structure can reduce the viscosity in high temperature, melting and spinning can be performed at a low temperature. Therefore, production with reduced energy consumption can be achieved, and products can be supplied at low cost.

The glass composition for a glass fiber according to the present invention preferably contains $B_2O_3$ of 1.1% to 3.4% in mass %.

The glass composition for a glass fiber according to the present invention preferably has a melting temperature $T_{melt}$ of 1500° C. or lower. The melting temperature $T_{melt}$ is a temperature at which the viscosity of the glass is $10^{2.0}$ dPa·s.

The glass composition for a glass fiber according to the present invention preferably has a spinning temperature $T_X$ of 1300° C. or lower. The spinning temperature $T_X$ is a temperature at which the viscosity of the glass is 1030 dPa·s.

The glass composition for a glass fiber according to the present invention preferably has a liquidus temperature $T_L$ of 1200° C. or lower.

The glass composition for a glass fiber according to the present invention preferably has a temperature difference $\Delta T_{XL}$ between the spinning temperature $T_X$ and the liquidus temperature $T_L$ of 80° C. or higher.

The glass composition for a glass fiber according to the present invention preferably has a mass loss rate of the glass of 10% or less when the glass having a weight corresponding to a specific gravity crushed and classified to a particle size of 300 μm to 500 μm in diameter is immersed in 100 ml of a 10 mass % HCl aqueous solution at 80° C. for 90 hours.

The glass composition for a glass fiber according to the present invention preferably has a mass loss rate of the glass of 5% or less when the glass having a weight corresponding to a specific gravity crushed and classified to a particle size of 300 µm to 500 µm in diameter is immersed in 100 ml of a 10 mass % NaOH aqueous solution at 80° C. for 90 hours.

The glass composition for a glass fiber according to the present invention preferably has a Young's modulus of 85 GPa or more.

The glass composition for a glass fiber according to the present invention preferably has a linear thermal expansion coefficient at 30° C. to 380° C. of $70\times10^7/°$ C. or less.

The glass composition for a glass fiber according to the present invention preferably has a dielectric constant at 25° C. and 1 MHz of 8 or less.

The glass composition for a glass fiber according to the present invention preferably has a dielectric loss tangent at 25° C. and 1 MHz of less than 0.003.

A glass fiber according to the present invention is made of the above glass composition for a glass fiber.

Advantageous Effects of Invention

According to the present invention, it is possible to provide a glass composition for a glass fiber that enables glass melting and sniping at a low temperature without any special treatment such as crushing of raw materials.

DESCRIPTION OF EMBODIMENTS

Hereinafter, with respect to the glass composition for a glass fiber according to the present invention, effects of components constituting the glass and the reason why the content thereof is defined as described above will be described. In the description of the content range of each component, % notation indicates mass %.

$SiO_2$ is an element that constitutes a glass network. The content thereof is 50% to 65%, and preferably 50.5% to 65%, 51% to 65%, 51.5% to 65%, 52% to 65%, 52% to 64.5%, 52% to 64%, 52% to 63.5%, 52% to 63%, 52.5% to 63%, 53% to 63%, 53.5% to 63%, 54% to 63%, 54% to 62.5%, 54% to 62%, 54% to 61.5%, 54% to 61%, 54.5% to 61%, 55% to 61%, 55.5% to 61%, 55.5% to 60.5%, and particularly preferably 56% to 60.5%. When the content of $SiO_2$ is too small, the structural strength of the glass is remarkably deteriorated, and the mechanical strength tends to be lowered. On the other hand, when the content of $SiO_2$ is too large, the viscosity in high temperature tends to increase. As a result, the melting temperature of the glass rises and the manufacturing cost increases. In addition, when the glass is to be melt at a low temperature, a step such as crushing of the raw material into fine powder is required, which also causes an increase in manufacturing cost.

$Al_2O_3$ is a component that prevents crystal precipitation and phase separation formation in molten glass. The content of $Al_2O_3$ is 12.3% to 13.7%, and preferably 12.3% to 13.6%, 12.3% to 13.5%, 12.4% to 13.5%, 12.4% to 13.4%, 12.5% to 13.4%, 12.6% to 13.4%, 12.7% to 13.4%, and particularly preferably 12.7% to 13.3%. When the content of $Al_2O_3$ is too small, the liquidus temperature rises and $\Delta T_{XL}$ tends to be small. In addition, the structural strength of the glass is remarkably deteriorated, and water resistance and chemical resistance tend to be lowered. On the other hand, when the content of $Al_2O_3$ is too large, the viscosity in high temperature of the glass tends to increase, and the meltability tends to deteriorate.

Similar to $SiO_2$, $B_2O_3$ is a component that forms the network of the glass network structure. However, unlike $SiO_2$, $B_2O_3$ does not increase the viscosity in high temperature of the molten glass, but rather has a function of lowering the viscosity in high temperature. The content of $B_2O_3$ is 1.1% to 5.5%, and preferably, 1.1% to 5.4%, 1.1% to 5.3%, 1.1% to 5.2%, 1.1% to 5.1%, 1.1% to 5%, 1.1% to 4.9%, 1.1% to 4.8%, 1.1% to 4.7%, 1.1% to 4.6%, 1.1% to 4.5%, 1.1% to 4.4%, 1.1% to 4.3%, 1.1% to 4.2%, 1.1% to 4.1%, 1.1% to 4%, 1.1% to 3.9%, 1.1% to 3.8%, 1.1% to 3.7%, 1.1% to 3.6%, 1.1% to 3.5%, 1.1% to 3.4%, 1.2% to 3.4%, 1.3% to 3.4%, 1.4% to 3.4%, 1.5% to 3.4%, 1.6% to 3.4%, 1.7% to 3.4%, 1.8% to 3.4%, 1.8% to 3.3%, 1.9% to 3.3%, 1.9% to 3.2%, 2% to 3.2%, 2.1% to 3.2%, 2.2% to 3.2%, 2.3% to 3.2%, 2.4% to 3.2%, 2.4% to 3.1%, 2.5% to 3.1%, and particularly preferably 2.5% to 3%. When the content of $B_2O_3$ is too small, the viscosity in high temperature tends to increase, and the meltability tends to deteriorate. On the other hand, when the content of $B_2O_3$ is too large, foreign glass such as scum is likely to be formed in the melting process. In addition, since the $B_2O_3$ raw material is expensive, the manufacturing cost increases.

MgO is a component that lowers the viscosity in high temperature. The content of MgO is 0% to 10%, and preferably 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0.1% to 4.5%, 0.2% to 4.5%, 0.3% to 4.5%, 0.4% to 4.5%, 0.5% to 4.5%, 0.6% to 4.5%, 0.7% to 4.5%, 0.8% to 4.5%, 0.9% to 4.5%, 1% to 4.5%, 1% to 4.4%, 1% to 4.3%, 1% to 4.2%, 1% to 4.1%, 1% to 4%, 1% to 3.9%, 1% to 3.8%, 1% to 3.7%, 1% to 3.6%, 1% to 3.5%, 1% to 3.4%, 1% to 3.3%, 1% to 3.2%, 1% to 3.1%, 1% to 3%, 1.1% to 3%, 1.2% to 3%, 1.3% to 3%, 1.4% to 3%, 1.5% to 3%, 1.6% to 3%, 1.6% to 2.9%, 1.7% to 2.9%, 1.7% to 2.8%, and particularly preferably 1.8% to 2.8%. When the content of MgO is too large, crystals such as diopside tend to be precipitated, the liquidus temperature tends to rise, and $\Delta T_{XL}$ tends to be small.

CaO is a component that lowers the viscosity in high temperature. The content of CaO is 15% to 30%, and preferably 15.5% to 30%, 16% to 30%, 16% to 29.5%, 16% to 29%, 16.5% to 29%, 17% to 29%, 17% to 28.5%, 17% to 28%, 17.5% to 28%, 18% to 28%, 18% to 27.5%, 18% to 27%, 18.5% to 27%, 19% to 27%, 19% to 26.5%, 19% to 26%, 19% to 25.5%, 19% to 25%, 19.5% to 25%, 20% to 25%, 20.5% to 25%, 20.8% to 25%, 21% to 25%, 21% to 24.9%, 21% to 24.8%, 21% to 24.7%, 21% to 24.6%, 21% to 24.5%, 21.1% to 24.5%, 21.2% to 24.5%, 21.3% to 24.5%, 21.4% to 24.5%, 21.5% to 24.5%, 21.6% to 24.5%, 21.7% to 24.5%, 21.8% to 24.5%, 21.9% to 24.5%, 22% to 24.5%, 22% to 24.4%, 22% to 24.3%, 22% to 24.2%, 22% to 24.1%, and particularly preferably 22% to 24%. When the content of CaO is too small, the viscosity in high temperature of the glass tends to increase, and the meltability tends to deteriorate. On the other hand, when the content of CaO is too large, the phase separation of the molten glass is increased, crystals such as anorthite and wollastonite tend to be precipitated, the liquidus temperature tends to rise, and $\Delta T_{XL}$ tends to be small.

When the viscosity in high temperature is simply lowered, $\Delta T_{XL}$ becomes smaller and the spinnability is lowered. Therefore, in the present invention, further, the ratios ((MgO+CaO)/MgO and ($SiO_2$+MgO+CaO)/MgO) of the above-described $SiO_2$, MgO, and CaO, which are constituent components of crystals such as diopside, anorthite, wollastonite, is adjusted so as to be near the eutectic point of the crystals, and thereby it is possible to lower the liquidus temperature and increase $\Delta T_{XL}$. (MgO+CaO)/MgO is 8 to 18, and preferably 8.1 to 18, 8.2 to 17.8, 8.3 to 17.6, 8.4 to 17.4, 8.5 to 17.2, 8.6 to 17, 8.7 to 16.8, 8.8 to 16.4, 8.9 to 16.2, 9 to 16, 9.1 to 15.8, 9.2 to 15.6, 9.3 to 15.4, 9.4 to 15.2, 9.5 to 15, 9.6 to 14.8, 9.7 to 14.6, 9.8 to 14.4, 9.9 to 14.2, and particularly preferably 10 to 14. (SiO$_2$+MgO+CaO)/ MgO is 30 to 80, and preferably 30 to 79, 30 to 79.5, 30 to 78.5, 30 to 78, 30 to 77.5, 30 to 77, 30 to 76.5, 30 to 76, 30 to 75.5, 30 to 75, 30 to 74.5, 30 to 74, 30 to 73.5, 30 to 73, 30 to 72.5, 30 to 72, 30 to 71.5, 30 to 71, 30 to 70.5, 30 to 70, 30 to 69.5, 30 to 69, 30 to 68.5, 30 to 68, 30 to 67.5, 30 to 67, 30 to 66.5, 30 to 66, 30.5 to 66, 31 to 66, 31.5 to 66, 32 to 66, 32 to 65.5, and particularly preferably 32 to 65. When (MgO+CaO)/MgO and/or (SiO$_2$+MgO+CaO)/MgO is too small or too large, the liquidus temperature tends to rise and $\Delta T_{XL}$ tends to be small.

Since the raw materials of SiO$_2$, MgO, and CaO are relatively inexpensive, increasing the total content of SiO$_2$, MgO, and CaO makes it easier to reduce the manufacturing cost. On the other hand, when the total content of SiO$_2$, MgO, and CaO is too large, crystals such as diopside, anorthite, and wollastonite tend to be precipitated, the liquidus temperature tends to rise, and $\Delta T_{XL}$ tends to be small. Therefore, SiO$_2$+MgO+CaO is 79% to 86%, and preferably 79.2% to 86%, 79.4% to 86%, 79.6% to 86%, 79.8% to 86%, 80% to 86%, 80% to 85.9%, 80% to 85.8%, 80% to 85.7%, 80% to 85.6%, 80% to 85.5%, 80% to 85.4%, 80% to 85.3%, 80% to 85.2%, 80% to 85.1%, 80% to 85%, 80.1% to 85%, 80.2% to 85%, 80.3% to 85%, 80.4% to 85%, 80.5% to 85%, 80.5% to 84.9%, 80.5% to 84.8%, 80.5% to 84.7%, 80.5% to 84.6%, and particularly preferably 80.5% to 84.5%.

ZnO is a component that lowers the viscosity in high temperature, but is a component that remarkably enhances the phase separation of the molten glass. In addition, since the ZnO raw material is expensive, when the content of ZnO is too large, the manufacturing cost increases. Therefore, the content of the ZnO is 0% to less than 1%, and preferably 0% to 0.9%, 0% to 0.8%, 0% to 0.7%, 0% to 0.6%, 0% to 0.5%, 0% to 0.4%, 0% to 0.3%, 0% to 0.2%, 0% to 0.1%. Particularly, ZnO is substantially not contained (less than 0.1%).

Alkali metal oxide components Li$_2$O, Na$_2$O, and K$_2$O are components that have a function as a flux that facilitates melting of the glass raw material and at the same time lowers the viscosity in high temperature. The total content of Li$_2$O, Na$_2$O, and K$_2$O is 0% to 2%, and preferably 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1%, and particularly preferably 0.1% to 1%. When the total content of Li$_2$O, Na$_2$O, and K$_2$O is too large, the amount of alkali extracted from the glass increases, the adhesive strength at the resin-glass interface decreases, and the mechanical strength of a composite material made of a resin and the glass tends to decrease. In addition, since the Li$_2$O, Na$_2$O, and K$_2$O raw materials are expensive, when the total content of Li$_2$O, Na$_2$O, and K$_2$O is too large, the manufacturing cost increases.

The preferred ranges of the contents of Li$_2$O, Na$_2$O, and K$_2$O are as follows.

The content of Li$_2$O is 0% to less than 1%, and preferably 0% to 0.9%, 0% to 0.8%, 0% to 0.7%, 0% to 0.6%, 0% to 0.5%, 0% to 0.4%, 0% to 0.3%, 0% to 0.2%, and particularly preferably 0% to 0.1%.

The content of Na$_2$O is 0% to 2%, and preferably 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1%, 0% to 0.9%, 0% to 0.8%, and particularly preferably 0.1% to 0.8%.

The content of K$_2$O is 0% to 2%, and preferably 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1%, 0% to 0.9%, 0% to 0.8%, and particularly preferably 0.1% to 0.8%.

TiO$_2$ is a component that improves chemical durability. The content of TiO$_2$ is 0% to less than 0.5%, and preferably 0% to 0.4%, and particularly preferably 0% to 0.3%. When the content of TiO$_2$ is too large, the viscosity in high temperature of the glass tends to increase, and the meltability tends to deteriorate. In addition, the glass tends to be colored yellow, and the transparency and light transmittance of the composite material made of a resin and the glass tend to be lost. However, since TiO$_2$ is mixed as an impurity, when it is attempted to completely remove TiO$_2$, the raw material batch is expensive and the manufacturing cost tends to increase. In order to prevent an increase in manufacturing cost, the lower limit of the content of TiO$_2$ is preferably 0.0001% or more, 0.0002% or more, 0.0003% or more, 0.0005% or more, and particularly preferably 0.001% or more.

The glass composition for a glass fiber according to the present invention may further contain various components in addition to the above components.

Fe$_2$O$_3$ is a component that lowers the viscosity in high temperature. The content of Fe$_2$O$_3$ is preferably 0% to 1%, 0% to 0.9%, 0% to 0.8%, 0% to 0.7%, 0% to 0.6%, and particularly preferably 0% to 0.5%. When the content of Fe$_2$O$_3$ is too large, the glass tends to be colored green or yellow, and the transparency and light transmittance of the composite material made of a resin and the glass tend to be lost. However, since Fe$_2$O$_3$ is mixed as an impurity, when it is attempted to completely remove Fe$_2$O$_3$, the raw material batch is expensive and the manufacturing cost tends to increase. In order to prevent an increase in manufacturing cost, the lower limit of the content of Fe$_2$O$_3$ is preferably 0.0001% or more, 0.0002% or more, 0.0003% or more, 0.0005% or more, 0.001% or more, 0.01% or more, 0.02% or more, 0.03% or more, 0.04% or more, and particularly preferably 0.05% or more.

P$_2$O$_5$ is a component that lowers the liquidus temperature, but is a component that remarkably enhances the phase separation of the molten glass. In addition, the P$_2$O$_5$ raw material is expensive and causes an increase in manufacturing cost, so that it is preferably not substantially contained (less than 0.1%). However, P$_2$O$_5$ is mixed as an impurity, when it is attempted to completely remove P$_2$O$_5$, the raw material batch is expensive and the manufacturing cost tends to increase. In order to prevent an increase in manufacturing cost, the lower limit of the content of P$_2$O$_5$ is preferably 0.0001% or more, 0.0002% or more, 0.0003% or more, 0.0005% or more, and particularly preferably 0.001% or more.

SrO and BaO are components that lower the viscosity in high temperature. The content of SrO is preferably 0% to 2%, 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1%, 0% to 0.9%, 0% to 0.8%, 0% to 0.7%, 0% to 0.6%, 0% to 0.5%, and particularly preferably 0.05% to 0.5%. The content of BaO is preferably 0% to 2%, 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1%, 0% to 0.9%, 0% to 0.8%, 0% to 0.7%, 0% to 0.6%, 0% to 0.5%, and particularly preferably 0.05% to 0.5%. When the content of SrO and/or BaO is too large, the phase separation of the molten glass tends to increase.

Further, one or more kinds of fining agents may be contained in order to reduce bubbles in the glass. As the fining agent, for example, $SO_3$, Cl, $SnO_2$, $Sb_2O_3$, $As_2O_3$ and the like can be used. In this case, the standard total amount of fining agents added is within 0.5%.

Further, in order to improve the chemical durability, the viscosity in high temperature and the like, in addition to the above components, components such as $Cr_2O_3$, PbO, $La_2O_3$, $WO_3$, $Nb_2O_5$ and $Y_2O_3$ may each be contained up to 3%.

Further, the glass composition for a glass fiber according to the present invention may contain, for example, $H_2$, $CO_2$, CO, $H_2O$, He, Ne, Ar and $N_2$ as impurities up to 0.1% each. Further, as impurities, Pt, Rh, and Au may each be contained up to 0.05% or less.

The glass composition for a glass fiber according to the present invention preferably has a melting temperature $T_{melt}$ (temperature at which the viscosity of the glass is $10^{2.0}$ dPa·s) of 1500° C. or lower, 1498° C. or lower, 1495° C. or lower, 1493° C. or lower, 1490° C. or lower, 1487° C. or lower, 1485° C. or lower, 1483° C. or lower, 1480° C. or lower, 1478° C. or lower, 1475° C. or lower, 1472° C. or lower, 1470° C. or lower, 1468° C. or lower, 1465° C. or lower, 1463° C. or lower, 1460° C. or lower, 1459° C. or lower, 1458° C. or lower, 1457° C. or lower, 1456° C. or lower, 1455° C. or lower, 1454° C. or lower, 1453° C. or lower, 1452° C. or lower, 1451° C. or lower, and particularly preferably 1450° C. or lower. When the melting temperature $T_{melt}$ is too high, the glass must be melted at a high temperature, which increases the consumption of heavy oil, gas, and electricity, leading to an increase in manufacturing cost.

The glass composition for a glass fiber according to the present invention preferably has a spinning temperature $T_X$ (temperature at which the viscosity of the glass is $10^{3.0}$ dPa·s) of 1300° C. or lower, 1298° C. or lower, 1295° C. or lower, 1293° C. or lower, 1290° C. or lower, 1288° C. or lower, 1285° C. or lower, 1283° C. or lower, 1280° C. or lower, 1279° C. or lower, 1278° C. or lower, 1277° C. or lower, 1276° C. or lower, 1275° C. or lower, 1274° C. or lower, 1273° C. or lower, 1272° C. or lower, 1271° C. or lower, 1270° C. or lower, 1269° C. or lower, 1268° C. or lower, 1267° C. or lower, 1266° C. or lower, 1265° C. or lower, 1264° C. or lower, 1263° C. or lower, 1262° C. or lower, 1261° C. or lower, and particularly preferably 1260° C. or lower. When $T_X$ is too high, it is necessary to spin the glass fiber at a high temperature, so that the bushing is likely to be deformed and the life is shortened, which leads to an increase in manufacturing cost.

The glass composition for a glass fiber according to the present invention preferably has a liquidus temperature $T_L$ of 1200° C. or lower, 1195° C. or lower, 1190° C. or lower, 1185° C. or lower, 1180° C. or lower, 1178° C. or lower, 1176° C. or lower, 1174° C. or lower, 1172° C. or lower, 1170° C. or lower, 1169° C. or lower, 1168° C. or lower, 1167° C. or lower, 1166° C. or lower, 1165° C. or lower, 1164° C. or lower, 1163° C. or lower, 1162° C. or lower, 1161° C. or lower, and particularly preferably 1160° C. or lower. When $T_L$ is too high, $\Delta T_{XL}$ becomes small and the spinnability deteriorates. That is, devitrified substances tend to be generated in the molten glass, and the thread breakage tends to be occurred. The liquidus temperature can be obtained by a method of filling a platinum boat of about 120 mm×20 mm×10 mm with a crushed sample, charging the platinum boat into an electric furnace having a linear temperature gradient for 16 hours, and calculating the temperature of the crystal precipitation portion determined by a microscope based on the temperature gradient graph of the electric furnace.

The glass composition for a glass fiber according to the present invention preferably has a temperature difference $\Delta T_{XL}$ between the spinning temperature $T_X$ and the liquidus temperature $T_L$ of 80° C. or higher, 81° C. or higher, 82° C. or higher, 83° C. or higher, 84° C. or higher, 85° C. or higher, 86° C. or higher, 87° C. or higher, 88° C. or higher, 89° C. or higher, 90° C. or higher, 91° C. or higher, 92° C. or higher, 93° C. or higher, 94° C. or higher, 95° C. or higher, 96° C. or higher, 97° C. or higher, 98° C. or higher, 99° C. or higher, and particularly preferably 100° C. or higher. When $\Delta T_{XL}$ is too small, the spinnability deteriorates.

The glass composition for a glass fiber according to the present invention preferably has a mass loss rate of the glass of 10% or less, 9.5% or less, 9% or less, 8.5% or less, 8% or less, 7.5% or less, 7% or less, 6.5% or less, 6.4% or less, 6.3% or less, 6.2% or less, 6.1% or less, and particularly preferably 6% or less, when the glass having a weight corresponding to a specific gravity classified to a particle size of 300 µm to 500 µm in diameter is immersed in 100 ml of a 10 mass % HCl aqueous solution at 80° C. for 90 hours. When the mass loss rate is too high, it is difficult to use the glass in applications that require acid resistance.

The glass composition for a glass fiber according to the present invention preferably has a mass loss rate of the glass of 5% or less, 4.8% or less, 4.6% or less, 4.4% or less, 4.2% or less, 4% or less, 3.8% or less, 3.6% or less, 3.4% or less, 3.2% or less, and particularly preferably 3% or less, when the glass having a weight corresponding to a specific gravity classified to a particle size of 300 µm to 500 µm in diameter is immersed in 100 ml of a 10 mass % NaOH aqueous solution at 80° C. for 90 hours. When the mass loss rate is too high, it is difficult to use the glass in applications that require alkali resistance.

The glass composition for a glass fiber according to the present invention preferably has a Young's modulus of 80 GPa or more, 80.5 GPa or more, 81 GPa or more, 81.5 GPa or more, 82 GPa or more, 82.5 GPa or more, 83 GPa or more, 83.5 GPa or more, 84 GPa or more, 84.5 GPa or more, 85 GPa or more, 85.5 GPa or more, 86 GPa or more, 86.5 GPa or more, and particularly preferably 87 GPa or more. When the Young's modulus is too low, the mechanical strength of the composite material made of a resin and the glass tends to decrease. The upper limit of the Young's modulus is not particularly limited, and is practically 200 GPa or less.

When the glass composition for a glass fiber according to the present invention has a linear thermal expansion coefficient at 30° C. to 380° C. of $70 \times 10^7/°$ C. or less, it is preferable that the glass composition is used for a printed wiring board or the like since the thermal expansion coefficient is low.

In addition to the above, when the glass composition for a glass fiber of the present invention has a dielectric constant of 8 or less and a dielectric loss tangent of less than 0.003 at a frequency of 1 MHz, since the dielectric loss is small, stable performance is exhibited when the glass composition is used for a printed wiring board or the like.

The glass fiber according to the present invention is characterized by having the above-mentioned composition and characteristics. The composition and characteristics are as described above, and description thereof will be omitted here. Further, the glass fiber according to the present invention is preferably used in the form of, for example, a chopped strand, a yarn, a roving or the like. The chopped strand is obtained by cutting a strand in which glass monofilaments are bundled to a predetermined length. The yarn is a twist of a strand. The roving is a combination of a plurality of strands and winding the same into a cylindrical shape.

Next, the method for producing the glass fiber according to the present invention will be described.

First, a glass raw material batch prepared to have the above composition (and characteristics) is charged into a glass melting furnace, vitrified, melted, and homogenized. The composition is as described above, and description thereof will be omitted here.

Subsequently, the molten glass is spun and formed into glass fibers. Specifically, the molten glass is supplied to the bushing. The molten glass supplied to the bushing is continuously drawn out in a filament shape from a large number of bushing nozzles provided on the bottom surface thereof. Various treatment agents are applied to the monofilaments drawn out in this manner, and the glass fibers are obtained by bundling the monofilaments in predetermined numbers.

The glass fiber according to the present invention thus formed is processed into chopped strands, yarns, rovings and the like, and is used for various purposes.

EXAMPLES

Hereinafter, the present invention will be described in detail based on Examples.

Table 1 shows Examples (samples Nos. 1 to 6) and Comparative Example (sample No. 7) of the present invention.

allowed to cool in air to obtain a massive glass sample. With respect to the glass sample thus obtained, the melting temperature, the spinning temperature, the liquidus temperature, the acid resistance, the alkali resistance, the Young's modulus, the linear thermal expansion coefficient, the dielectric constant, and the dielectric loss tangent were measured. The results are shown in Table 1.

The melting temperature $T_{melt}$ (the temperature at which the viscosity of the glass was $10^{2.0}$ dPa·s) and the spinning temperature $T_X$ (the temperature at which the viscosity of the glass was $10^{3.0}$ dPa·s) were evaluated as follows. The massive glass sample was crushed to an appropriate size and charge into an alumina crucible such that air bubbles were not caught as much as possible. Subsequently, the alumina crucible was heated to bring the sample into a molten state, the measured values of the viscosity of the glass at multiple temperatures were obtained by a platinum ball pulling method, and a viscosity curve was created by calculating the constant of the Vogel-Fulcher equation. The temperature was measured by the method of calculating the temperature at which the viscosity of the glass was $10^{3.0}$ dPa·s and the temperature at which the viscosity of the glass was $10^{2.0}$ dPa·s by interpolation.

For the measurement of the liquidus temperature $T_L$ the temperature measured by filling a platinum boat of about 120 mm×20 mm×10 mm with a crushed sample, charging the platinum boat into an electric furnace having a linear temperature gradient for 16 hours, and calculating the temperature of the crystal precipitation portion determined by a

TABLE 1

| Mass % | No. 1 | No. 2 | No. 3 | No. 4 | No. 5 | No. 6 | No. 7 |
|---|---|---|---|---|---|---|---|
| $SiO_2$ | 58.0 | 57.0 | 58.0 | 56.9 | 60.4 | 56.2 | 58.5 |
| $Al_2O_3$ | 13.3 | 12.7 | 12.4 | 13.7 | 13.1 | 13.2 | 16.5 |
| $B_2O_3$ | 1.5 | 3.1 | 2.1 | 2.8 | 1.2 | 4.2 | 0.1 |
| MgO | 2.5 | 2.1 | 2.6 | 2.2 | 1.3 | 1.9 | 9.4 |
| CaO | 23.0 | 24.4 | 23.5 | 23.0 | 22.0 | 22.5 | 13.6 |
| SrO | — | — | 0.05 | — | — | — | — |
| BaO | — | — | — | 0.05 | — | — | — |
| $Na_2O$ | 0.59 | 0.04 | 0.65 | 0.35 | 0.42 | 0.08 | 0.20 |
| $K_2O$ | 0.38 | 0.09 | 0.12 | 0.51 | 0.84 | 1.21 | 0.30 |
| $Fe_2O_3$ | 0.34 | 0.22 | 0.34 | 0.22 | 0.27 | 0.31 | 0.40 |
| $TiO_2$ | 0.11 | 0.15 | 0.21 | 0.35 | 0.44 | 0.36 | 1.00 |
| $SiO_2$ + MgO + CaO | 83.50 | 83.50 | 84.10 | 82.10 | 83.70 | 80.60 | 81.50 |
| ($SiO_2$ + MgO + CaO)/MgO | 33.40 | 39.76 | 32.35 | 37.32 | 64.38 | 42.42 | 8.67 |
| (MgO + CaO)/MgO | 10.20 | 12.62 | 10.04 | 11.45 | 17.92 | 12.84 | 2.45 |
| Melting temperature $T_{melt}$ [° C.] | 1416 | 1385 | 1390 | 1404 | 1444 | 1383 | 1502 |
| Spinning temperature $T_X$ [° C.] | 1236 | 1207 | 1210 | 1223 | 1257 | 1201 | 1301 |
| Liquidus temperature $T_L$ [° C.] | 1134 | 1104 | Unmeasured | 1115 | 1157 | 1095 | 1222 |
| $\Delta T_{XL}$ [° C.] | 102 | 103 | Unmeasured | 108 | 100 | 106 | 79 |
| Acid resistance [%] | 1.9 | 4.5 | 3.1 | 3.8 | 1.3 | 5.9 | Unmeasured |
| Alkali resistance [%] | 2.9 | 2.5 | 2.8 | 2.6 | 2.7 | 2.5 | Unmeasured |
| Young's modulus [GPa] | 89.6 | 89.7 | 89.8 | 89.2 | 87.6 | 89.9 | Unmeasured |
| Linear thermal expansion coefficient [×$10^{-7}$/° C.] | 62 | 61 | 63 | 61 | 60 | 62 | Unmeasured |
| Dielectric constant | 7.1 | 7.0 | Unmeasured | Unmeasured | Unmeasured | Unmeasured | Unmeasured |
| Dielectric loss tangent | 0.0013 | 0.0006 | Unmeasured | Unmeasured | Unmeasured | Unmeasured | Unmeasured |

Each sample was prepared as follows.

First, various glass raw materials such as natural raw materials and chemical raw materials were weighed and mixed so as to have the glass composition shown in Table 1, and a glass batch of 500 g was prepared. Next, this glass batch was charged into a platinum rhodium alloy crucible and then melted at 1500° C. for 4 hours. Subsequently, the obtained molten glass was poured into a refractory mold and microscope based on the temperature gradient graph of the electric furnace was taken as the liquidus temperature $T_L$.

The acid resistance was measured as follows. First, the above massive glass sample was crushed, glass having a particle size of 300 μm to 500 μm in diameter was precisely weighed by the weight corresponding to the specific gravity, then immersed in 100 ml of a 10 mass % HCl solution and shaken at 80° C. for 90 hours. Then, the weight loss rate of the glass sample was measured. The smaller this value is, the better the acid resistance is.

The alkali resistance was measured as follows. First, the above massive glass sample was crushed, glass having a particle size of 300 μm to 500 μm in diameter was precisely weighed by the weight corresponding to the specific gravity, then immersed in 100 ml of a 10 mass % NaOH solution and shaken at 80° C. for 90 hours. Then, the weight loss rate of the glass sample was measured. The smaller this value is, the better the alkali resistance is.

The Young's modulus was measured in a room temperature environment using a free resonance type elastic modulus measuring device for a sheet-shaped sample (40 mm×20 mm×2 mm) whose surface was polished with a polishing solution in which No. 1200 alumina powder was dispersed.

The linear thermal expansion coefficient was evaluated by an average linear thermal expansion coefficient measured in the temperature ranges of 30° C. to 380° C. using a sample processed to 20 mm×3.8 mm (diameter). Diatometer manufactured by NETZSCH was used in the measurement.

The dielectric constant and the dielectric loss tangent were measured in a room temperature environment under a frequency of 1 MHz using an impedance analyzer for a sheet-shaped sample (50 mm×50 mm×3 mm) whose surface was polished with a polishing solution in which No. 1200 alumina powder was dispersed.

As seen from the table, sample Nos. 1 to 6, which are Examples, have a melting temperature $T_{melt}$ of 1500° C. or lower, a spinning temperature $T_X$ of 1300° C. or lower, a liquidus temperature $T_L$ of 1200° C. or lower, and the acid resistance, alkali resistance, the Young's modulus, the linear thermal expansion coefficient, the dielectric constant, and the dielectric loss tangent thereof show characteristic values suitable for glass for fiber reinforced plastics (FRP) applications.

In contrast, it is seen that sample No. 7, which is Comparative Example, has a melting temperature $T_{melt}$ of higher than 1500° C., a spinning temperature $T_X$ of higher than 1300° C., and melting and spinning at a low temperature are difficult.

The invention claimed is:

1. A glass composition for a glass fiber, comprising: in mass %, $SiO_2$: 50% to 65%, $Al_2O_3$: 12.3% to 13.7%, $B_2O_3$: 1.1% to 5.5%, MgO: 0% to 10%, CaO: 15% to 30%, ZnO: 0% to less than 0.1%, $Li_2O$: 0% to less than 1%, $Na_2O$: 0% to 2%, $K_2O$: 0% to 2%, $TiO_2$: 0% to 0.44%, $SiO_2$+MgO+CaO: 80.0% to 86.0%, $Li_2O$+$Na_2O$+$K_2O$: 0% to 2%, and being substantially free of $P_2O_5$, wherein ($SiO_2$+MgO+CaO)/MgO is 30 to 80, and (MgO+CaO)/MgO is 8 to 18 in a mass ratio, and wherein a temperature difference $\Delta T_{XL}$ between $T_X$ and $T_L$ is 80° C. or higher, where $T_X$ is a spinning temperature and $T_L$ is a liquidus temperature.

2. The glass composition for a glass fiber according to claim 1, wherein a content of $B_2O_3$ is 1.1% to 3.4% in mass %.

3. The glass composition for a glass fiber according to claim 1, wherein a melting temperature $T_{melt}$ is 1500° C. or lower.

4. The glass composition for a glass fiber according to claim 1, wherein the spinning temperature $T_X$ is 1300° C. or lower.

5. The glass composition for a glass fiber according to claim 1, wherein the liquidus temperature $T_L$ is 1200° C. or lower.

6. The glass composition for a glass fiber according to claim 1, wherein a mass loss rate of the glass when the glass having a weight corresponding to a specific gravity crushed and classified to a particle size of 300 μm to 500 μm in diameter is immersed in 100 ml of a 10 mass % HCl aqueous solution at 80° C. for 90 hours is 10% or less.

7. The glass composition for a glass fiber according to claim 1, wherein a mass loss rate of the glass when the glass having a weight corresponding to a specific gravity crushed and classified to a particle size of 300 μm to 500 μm in diameter is immersed in 100 ml of a 10 mass % NaOH aqueous solution at 80° C. for 90 hours is 5% or less.

8. The glass composition for a glass fiber according to claim 1, wherein a Young's modulus is 85 GPa or more.

9. The glass composition for a glass fiber according to claim 1, wherein a linear thermal expansion coefficient at 30° C. to 380° C. is $70 \times 10^{-7}$/° C. or less.

10. The glass composition for a glass fiber according to claim 1, wherein a dielectric constant at 25° C. and 1 MHz is 8 or less.

11. The glass composition for a glass fiber according to claim 1, wherein a dielectric loss tangent at 25° C. and 1 MHz is less than 0.003.

12. A glass fiber, comprising: the glass composition for a glass fiber according to claim 1.

13. The glass composition for a glass fiber according to claim 2, wherein a melting temperature $T_{melt}$ is 1500° C. or lower.

14. The glass composition for a glass fiber according to claim 2, wherein the spinning temperature $T_X$ is 1300° C. or lower.

15. The glass composition for a glass fiber according to claim 3, wherein the spinning temperature $T_X$ is 1300° C. or lower.

16. The glass composition for a glass fiber according to claim 13, wherein the spinning temperature $T_X$ is 1300° C. or lower.

17. The glass composition for a glass fiber according to claim 2, wherein the liquidus temperature $T_L$ is 1200° C. or lower.

18. The glass composition for a glass fiber according to claim 3, wherein the liquidus temperature $T_L$ is 1200° C. or lower.

19. The glass composition for a glass fiber according to claim 1, wherein a content of $TiO_2$ is 0.21% to 0.4% in mass %.

* * * * *